US010276213B2

(12) United States Patent
Tandon et al.

(10) Patent No.: US 10,276,213 B2
(45) Date of Patent: Apr. 30, 2019

(54) AUTOMATIC AND INTELLIGENT VIDEO SORTING

(71) Applicant: ADOBE INC., San Jose, CA (US)

(72) Inventors: Sagar Tandon, Uttar Pradesh (IN); Andaleeb Fatima, Noida (IN); Abhishek Shah, Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/602,006

(22) Filed: May 22, 2017

(65) Prior Publication Data

US 2018/0336931 A1    Nov. 22, 2018

(51) Int. Cl.
| | |
|---|---|
| *H04N 9/80* | (2006.01) |
| *G11B 27/34* | (2006.01) |
| *G06K 9/00* | (2006.01) |
| *G11B 27/031* | (2006.01) |
| *G11B 27/22* | (2006.01) |
| *G06F 16/78* | (2019.01) |
| *G06F 16/783* | (2019.01) |

(52) U.S. Cl.
CPC ............ *G11B 27/34* (2013.01); *G06F 16/784* (2019.01); *G06F 16/7867* (2019.01); *G06K 9/00718* (2013.01); *G06K 9/00751* (2013.01); *G06K 9/00765* (2013.01); *G11B 27/031* (2013.01); *G11B 27/22* (2013.01)

(58) Field of Classification Search
CPC ........... G06K 9/00718; G06K 9/00765; G06K 9/00744; G11B 27/031; G11B 27/22; G11B 27/34; G06F 16/783; G06F 16/75; G06F 17/3082; H04N 21/8549

USPC .................................................. 386/290, 241
See application file for complete search history.

(56) References Cited

U.S. PATENT DOCUMENTS

| | | | |
|---|---|---|---|
| 7,074,999 B2 * | 7/2006 | Sitrick ................. | G09B 15/023 84/477 R |
| 8,649,573 B1 * | 2/2014 | Darbari .............. | G06K 9/00751 382/118 |
| 8,826,117 B1 * | 9/2014 | Junee .................... | G11B 27/034 715/230 |
| 9,721,551 B2 * | 8/2017 | Silverstein ............. | G06N 7/005 |
| 9,818,451 B1 * | 11/2017 | Tyagi ..................... | G11B 27/34 |
| 2006/0120624 A1 * | 6/2006 | Jojic ................ | G06F 17/30843 382/284 |
| 2006/0224940 A1 * | 10/2006 | Lee ...................... | G11B 27/034 715/203 |

(Continued)

*Primary Examiner* — Helen Shibru
(74) *Attorney, Agent, or Firm* — Brake Hughes Bellermann LLP (57) ABSTRACT

Systems and methods disclosed herein provide automatic and intelligent video sorting in the context of creating video compositions. A computing device sorts a media bin of videos in the user's work area based on similarity to the videos included in the video composition being created. When a user selects or includes a particular video on the composition's timeline, the video is compared against the entire video collection to change the display of videos in the media bin. In one example, videos that have similar tags to a selected video are prioritized at the top. Only a subset of frames of each of the videos are used to use to identify video tags. Intelligently selecting tags using a subset of frames from each video rather than using all frames enables more efficient and accurate tagging of videos, which facilitates quicker and more accurate comparison of video similarities.

20 Claims, 7 Drawing Sheets

(56) References Cited

U.S. PATENT DOCUMENTS

| | | | |
|---|---|---|---|
| 2007/0101271 A1* | 5/2007 | Hua | G11B 27/034 |
| | | | 715/731 |
| 2015/0098690 A1* | 4/2015 | Abbate | G11B 27/031 |
| | | | 386/231 |
| 2016/0048989 A1* | 2/2016 | Gabbidon | G06T 11/60 |
| | | | 715/716 |
| 2016/0111128 A1* | 4/2016 | Nowak | G11B 27/031 |
| | | | 386/219 |
| 2017/0236551 A1* | 8/2017 | Leiberman | G11B 27/036 |
| | | | 386/285 |
| 2018/0122422 A1* | 5/2018 | Allison | H04N 21/42202 |
| 2018/0173959 A1* | 6/2018 | Shah | G06K 9/00765 |
| 2018/0279014 A1* | 9/2018 | Chen | H04N 5/2624 |

* cited by examiner

AUTOMATIC AND INTELLIGENT VIDEO SORTING

TECHNICAL FIELD

This disclosure relates generally to computer-implemented techniques and more particularly relates to improving the efficiency and effectiveness of computing systems that organize and use videos.

BACKGROUND

Existing software applications enable the creation of video compositions involving multiple videos combined with one another. In one example, a user creates a composition that plays five video one after another by specifying the positions of the videos on a timeline. In another example, portions of one or more of the videos are blended at video transitions by placing videos on different, partially-overlapping tracks on such a timeline. While these video composition creation applications provide numerous features to enable the creation of video compositions, the applications generally do not facilitate the user's finding and selection of videos to include in such compositions. Video professionals and enthusiasts accumulate large volumes of video data over time. When working on a composition project, visually scanning this tremendous amount of data to find relevant videos is a difficult task. For example, consider a videographer planning to build a wedding portfolio for a client. For this project, he would need to manually review each video in his collection to check if it is about a wedding or not and then filter out relevant videos. This manual search consumes a considerable amount of time, delaying the actual creative work. One way to attempt to address this burden is to manually apply relevant tags to all of the videos in the video collection so that quicker tag-based searches can be used. However, tagging all videos in a video collection can be extremely burdensome and requires consistent book-keeping of new videos to apply relevant tags on an ongoing basis. Thus, manual tagging methods are generally too burdensome and time consuming, especially for large video collections, to be practical.

SUMMARY

Systems and methods disclosed herein provide automatic and intelligent video sorting in the context of video composition creation and other contexts. In one exemplary embodiment of the invention a computing device sorts videos of a video collection for selection to be included in a composition. This embodiment involves providing a user interface for display, for example, in a video composition creation software application. The user interface includes a media bin having icons representing videos of a video collection that are available to be included in the composition. The user interface also includes a timeline identifying videos included in the composition at respective times within the composition. The embodiment of the invention further involves identifying a currently-selected video included in the composition and assigning weights to the videos in the composition based on distances on the timeline of the videos in the composition to the currently-selected video. The embodiment of the invention identifies content tags corresponding to the videos in the composition and identifies a set of those content tags based on the weights assigned to the videos in the composition. The embodiment of the invention scores the videos in the video collection based on the set of the content tags and sorts the icons of the videos in the video collection for display in the media bin based on the scoring.

In one exemplary embodiment of the invention, a computing device intelligently identifies tags for one or more videos. In this example, the computing device divides a video into segments, for example, based on scene changes, the number of faces in adjacent frames, and/or number of objects in adjacent frames. The computing device intelligently selects a subset of the frames of each segment, for example, based on segment activity level, segment length, and/or other factors. The selected frames, rather than all frames of the video segments, are used as input to an image tagging engine to identify tags for the video.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Techniques providing automatic and intelligent video sorting are disclosed. As described above, existing video composition creation software applications do not facilitate a user finding and selecting videos to include in a composition. Techniques of the invention present a media bin of videos that are sorted based on similarity to one or more of the videos that are included in a composition. For example, icons of videos are presented in a sorted order in the media bin with more relevant videos presented before less relevant videos. If the user is creating a composition project of multiple videos combined along a project timeline, for example, the current video that the user is working with and/or other videos in the timeline can be used to sort other videos in the media bin that the user may wish to also include in the composition project.

Embodiments of the invention use a predictive algorithm to sort videos in a media bin on a user's work-area based on the user's selections of one or more videos for a composition project. When a user selects a particular video, properties of the video are analyzed and compared against the user's entire video collection to change the display of the video listings in the media bin. In one example, videos that are similar to the selected video (based on a property value comparison) are prioritized at the top of the work-area. This ordering is changed based on the user's subsequent selection of a video from the work-area or the current composition project on which s/he is working. In one example, a wildlife enthusiast goes on a 5-day jungle safari and shoots a series of videos. When planning to create a summary clip, he seeks to isolate relevant videos. As soon as he selects one video from the work-area, related videos from the user's media bin are sorted and presented based on priority/relevance. In this example, selection of a video of a lion results in videos of lions and other wildlife being prioritized and sorted relative to other videos.

Embodiments of the invention enable comparison of the similarity of videos by intelligently selecting frames of the video to be used by an automatic tagging process. Prior attempts to automatically tag videos have often involved attempting to use each of all of the frames of a video using an image tagging engine. Such attempts were generally inefficient and inaccurate and required far too much time to be practical for most applications. By intelligently selecting a subset of frames from each video rather than using all frames of each video, techniques of the invention enable more efficient and accurate tagging of videos, which facilitates quicker and more accurate comparison of video similarities. The selection of frames of the videos to use for the tagging can account for variability in the quality (e.g., blurriness) of the video in different frames, the amount of activity in the video, the length of the video, and/or other attributes of each individual video. In one example, videos are classified based on activity (e.g., as either low activity or high activity), based on a determination of the amount of change in the videos. Frames of the videos are then intelligently selected based on the classification. For example, fewer frames (e.g., 1 or 2) can be selected for the low activity videos while relatively more frames (e.g., 3 or more) can be selected for the high activity videos.

Terminology

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, desktop computers, laptop computers, server computers, tablets, telephones, mobile telephones, televisions, portable data assistant (PDA), e-readers, portable game units, smart watches, etc.

As used herein, the phrase "video" refers to moving images presented as a sequence of static images, i.e., frames. In the computer context, videos are commonly stored as files that include data representing the appearance of the frames. Video frames typically represent snapshots of a real or artificial scene taken at regularly-spaced interfaces, e.g., 50 frames per second. Videos can, but do not necessarily, include sound.

As used herein, the phrase "video collection" refers to two or more separate videos that are stored together or otherwise associated with one another in a grouping. For example, a user may store all of the videos that he or she captures in a video collection stored on the user's computer hard drive and/or cloud storage.

As used herein, the phrase "composition" refers to a video that combines two or more other videos. The videos included in a composition can be combined in a single file or remain separate from one another, for example, with metadata of the composition specifying how the videos are combined for playback. Video composition creation software applications can provide a timeline along which users can position videos to create video compositions. Additionally, or alternatively, the applications can allow the creation and use of tracks upon which videos can be added to be included in the composition.

As used herein, the phrase "media bin" refers to a portion of a workspace of a user interface that displays media (e.g., videos) that can be selected for inclusion in a project. In one example, a media bin displays icons of videos that can be included in a video composition project. The videos depicted in such a media bin can be those from one or more video collections, e.g., all of the videos on a user's hard drive, cloud storage account, and/or within a particular file folder.

As used herein, the phrases "tag" and "content tag" refer to a word or phrase that describes an object, scene, location, action, or any other attribute of the content depicted in an image or video. Examples of tags include, but are not limited to, "dog," "man," "table," "blue," "running," "car," "beach," and "highway."

As used herein, the phrase "image tagging engine" refers to a computer-implemented application or device configured to generate or otherwise identify tags for an image. Exemplary image tagging engines can use, but are not limited to using, machine learning, pattern matching, and/or other image comparison techniques to identify tags for images.

As used herein, the phrase "blurriness" refers to an amount of lack of clarity in an image or frame, for example, caused by an image/frame being captured with the capture device (e.g., camera) out of focus, with a person or object moving, with the capture device moving, and/or with a depth of field that is too shallow.

Exemplary Computing Environment

Figure 1:
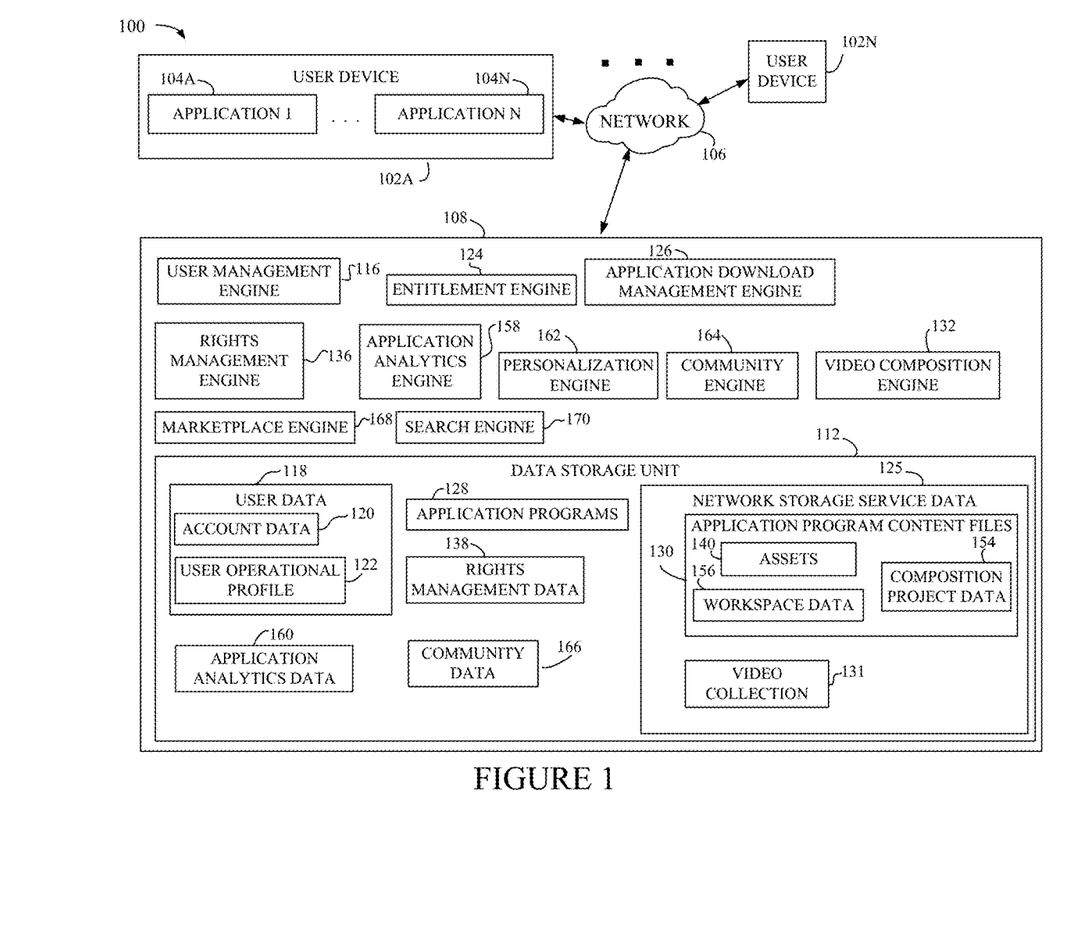
FIG. 1 is a diagram of an environment in which one or more embodiments of the present disclosure can be practiced.

FIG. 1 is a diagram of an environment 100 in which one or more embodiments of the present disclosure can be practiced. The environment 100 includes one or more user devices, such as a user device 102A up to a user device 102N. Each of the user devices is connected to a creative apparatus 108 via a network 106. A user of the user devices uses various products, applications, or services supported by the creative apparatus 108 via the network 106. The user devices correspond to various users. Examples of the users include, but are not limited to, creative professionals or hobbyists who use creative tools to generate, edit, track, or manage creative content, end users, administrators, users who use document tools to create, edit, track, or manage documents, advertisers, publishers, developers, content owners, content managers, content creators, content viewers, content consumers, designers, editors, any combination of these users, or any other user who uses digital tools to create, edit, track, or manage digital experiences.

Digital tool, as described herein, includes a tool that is used for performing a function or a workflow electronically. Examples of the digital tool include, but are not limited to, a content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the creative apparatus 108.

Digital experience, as described herein, includes experience that can be consumed through an electronic device. Examples of a digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, text, image, video, website, webpage, user interface, menu item, tool menu, magazine, slideshow, animation, social post, comment, blog, data feed, audio, advertisement, vector graphic, bitmap, document, any combination of one or more content, or any other electronic content.

Examples of the user devices include, but are not limited to, a personal computer (PC), tablet computer, a desktop computer, a processing unit, any combination of these devices, or any other suitable device having one or more processors. Each user device includes at least one application supported by the creative apparatus 108.

It is to be appreciated that following description is now explained using the user device 102A as an example and any other user device can be used.

Examples of the network 106 include, but are not limited to, internet, local area network (LAN), wireless area network, wired area network, wide area network, and the like.

The creative apparatus 108 includes one or more engines for providing one or more digital experiences to the user. The creative apparatus 108 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The creative apparatus 108 also includes a data storage unit 112. The data storage unit 112 can be implemented as one or more databases or one or more data servers. The data storage unit 112 includes data that is used by the engines of the creative apparatus 108.

A user of the user device 102A visits a webpage or an application store to explore applications supported by the creative apparatus 108. The creative apparatus 108 provides the applications as a software as a service (SaaS), or as a standalone application that can be installed on the user device 102A, or as a combination. The user creates a user account with the creative apparatus 108 by providing user details and also by creating login details. Alternatively, the creative apparatus 108 can automatically create login details for the user in response to receipt of the user details. In some embodiments, the user is also prompted to install an application manager. The application manager enables the user to manage installation of various applications supported by the creative apparatus 108 and also to manage other functionalities, such as updates, subscription account and the like, associated with the applications. The user details are received by a user management engine 116 and stored as user data 118 in the data storage unit 112. In some embodiments, the user data 118 further includes account data 120 under which the user details are stored.

The user can either opt for a trial account or can make payment based on type of account or subscription chosen by the user. Alternatively, the payment can be based on product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user, i.e. free, trial, student, discounted, or paid.

The user management engine 116 and the entitlement engine 124 can be one single engine performing the functionalities of both the engines.

The user installs various applications supported by the creative apparatus 108 via an application download management engine 126. For example, a user may install a video composition creation application on user device 102A to create video compositions using local and/or remotely-stored videos. Application installers or application programs 128 present in the data storage unit 112 are fetched by the application download management engine 126 and made available to the user directly or via the application manager. In one embodiment, all application programs 128 are fetched and provided to the user via an interface of the application manager. In another embodiment, application programs 128 for which the user is eligible based on the user's operational profile 122 are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages the process of providing updates to the user device 102A.

Upon download, installation and launching of an application program, in one embodiment, the user is asked to provide login details to access the user's account. A check is again made by the user management engine 116 and the entitlement engine 124 to ensure that the user is entitled to use the application program. In another embodiment, direct access is provided to the application program as the user is already logged into the application manager. A user device's access to user data stored on the creative apparatus 108 is similarly based on the device being authorized to access the associated user account.

The creative apparatus 108 includes network storage service data 125 with application program content files 130 and video collections 131. This data is associated with user accounts and accessible by user devices that are authorized to access the user accounts. The data can be associated with electronic content created and edited using the various engines provided by the creative apparatus 108. The network storage service data 125 can provide cloud storage for each of multiple people working on a video composition or other creative project together. Each user account is associated with some of the content files. The content files associated with a user account are available on any device authorized to access the user account. In one example, two users each create user accounts and create content files that are associated with their respective accounts. Their content files are stored in the network storage service data 125 and accessible to the users on their other computing devices.

The video composition engine 132 and/or video composition apps on the user devices 102A-N enable the users to create and edit video compositions on their computing devices. For example, one of the users may select and combine 10 videos from the user's video collection 131 into a video composition project by positioning the 10 videos on tracks along a timeline of the composition. The users may also create, store, and/or share assets 140 (e.g., videos) and/or composition project data 154 with one another. For example, the first user may share a composition project having composition project data and video files associated within it with the second user. Sharing the project allows the second user to access, view, copy, and/or edit the associated assets.

The application program content files 130 are created by a user using one or more application programs 128 to create one or more projects or assets. In addition, the user also has a workspace within each application program. The workspace, as described herein, includes settings of the application program, settings of tools or settings of the user interface provided by the application program, and any other settings or properties specific to the application program. Each user has a workspace. The workspace data 156 is stored as part of the application program content files 130 in the data storage unit 112. The application program content files 130 can be specific to the user or can be shared with other users based on rights management. The rights management is performed by a rights management engine 136. Rights management rules or criteria are stored as rights management data 138 in the data storage unit 112.

The application program content files 130 include one or more assets 140. The assets 140 can be a shared asset which the user wants to share with other users or which the user wants to offer on a marketplace. The assets 140 can also be shared across multiple application programs 128. Each asset can include metadata. In addition, in one embodiment, each asset also includes a file. Examples of the file include, but are not limited to, an image, text, a video, a font, a document, a combination of any of these, and the like.

The application program content files 130 also include composition project data 154 and workspace data 156. In one embodiment, the composition project data 154 includes the assets 140. In another embodiment, the assets 140 are standalone assets. Similarly, the workspace data 156 can be part of the composition project data 154 in one embodiment while it may be standalone data in another embodiment.

The user can have one or more user devices. The application program content files 130 are accessible by the user from any device, i.e. including the device which was not used to create the content files. The content files 130 can be made available for access by the user or other users and synchronized on multiple devices. Before accessing the application program content files 130 by the user from any other device or by any other user, the user or the other user may need to provide login details for authentication if not already logged in. The workspace data 156 enables the same workspace configuration to be provided the user on any other device or to the other user.

In some embodiments, the user interaction with the application programs 128 is also tracked by an application analytics engine 158 and stored as application analytics data 160. The application analytics data 160 includes, for example, usage of a tool, usage of a feature, usage of a workflow, usage of the assets 140, and the like. The application analytics data 160 can include the usage data on a per user basis and can also include the usage data on a per tool basis or per feature basis or per workflow basis or any other basis. The application analytics engine 158 embeds a piece of code in the application programs 128 that enables an application program to collect the usage data and send it to the application analytics engine 158. The application analytics engine 158 stores the usage data as the application analytics data 160 and processes the application analytics data 160 to draw meaningful output. For example, the application analytics engine 158 can draw an output that the user uses "Tool 4" more than a threshold number of times. The output of the application analytics engine 158 is used by a personalization engine 162 to personalize a tool menu for the user to show "Tool 4" on top. Other types of personalization can also be performed based on the application analytics data 160. In addition, the personalization engine 162 can also use the workspace data 156 or the user data 118, including user preferences, to personalize one or more application programs 128 for the user.

The creative apparatus 108 also includes a community engine 164 which enables creation of various communities and collaboration among the communities. A community, as described herein, includes a group of users that share at least one common interest. The community can be closed, i.e. limited to a number of users or can be open, i.e. anyone can participate. The community enables the users to share each other's work and comment on or like each other's work. The work includes the content files 130. The community engine 164 stores any data corresponding to the community, such as work shared on the community and comments or likes received for the work as community data 166. The community data 166 also includes notification data and is used for notifying other users by the community engine in case of any activity related to the work or new work being shared. The community engine 164 provides collaborative workflows to the user. For example, the user can create an image and can request an expert opinion or expert editing from another user. An expert user can then either edit the image as per the user liking or can provide the expert opinion. The editing and providing of the expert opinion by the expert is enabled using the community engine 164. In collaborative workflows, each of a plurality of users is assigned different tasks related to the work.

The creative apparatus 108 also includes a marketplace engine 168 for providing a marketplace to one or more users. The marketplace engine 168 enables the user to offer a video, video composition, or other asset for sale or use. The marketplace engine 168 has access to the assets 140 that the user wants to offer on the marketplace. The creative apparatus 108 also includes a search engine 170 to enable searching of the assets 140 in the marketplace. The search engine 170 is also a part of one or more application programs 128 to enable the user to search for the assets 140 or any other type of the application program content files 130. The search engine 170 can perform a search for a video, video composition, or other asset using the metadata or the file. Tags generated from video tagging techniques described herein can be used to tag videos and/or video compositions to enable and improve the search capabilities relative to those assets. In one example, all of the tags identified for videos included in a composition are included as metadata of the video composition. A search for video compositions using search engine 170 that includes one or more of those tags will more effectively identify the video composition in its search results.

It is to be appreciated that the engines and working of the engines are described as examples herein and the engines can be used for performing any step in providing digital experience to the user.

Exemplary User Interfaces

Figure 2:
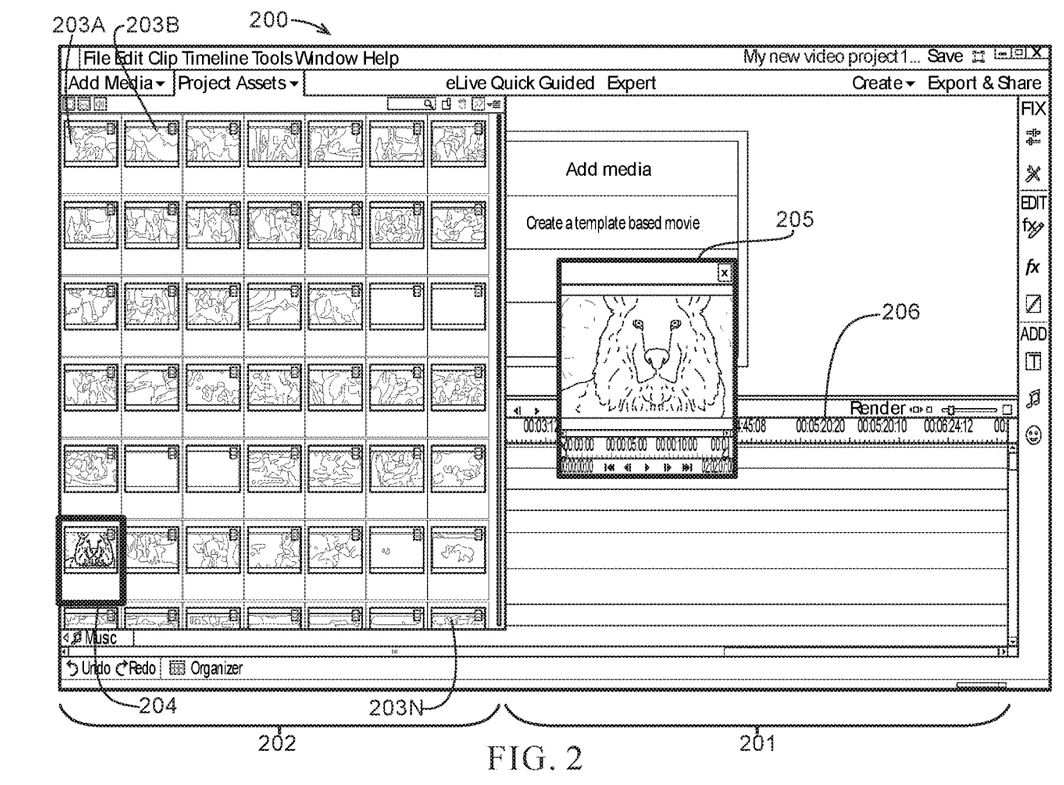
FIG. 2 is a block diagram illustrating an exemplary user interface for creating a video composition in which a video has been selected for inclusion in the composition.

FIG. 2 is a block diagram illustrating an exemplary user interface 200 for creating a video composition. The user interface 200 includes a composition portion 201 in which the videos are included in a video composition being created. The user interface also includes a media bin portion 202 in which icons 203A-N of videos of a video collection are displayed, accessed, and selected. In this example, a user is in the process of selecting a video (e.g., the video corresponding to video selection indicator 204) and positioning a representation 205 of the selected video on a timeline 206 of the video composition that is being created. In a similar way, the user is able to add multiple videos at different times on the timeline and/or in different tracks of the composition to create a composition that includes multiple videos.

Figure 3:
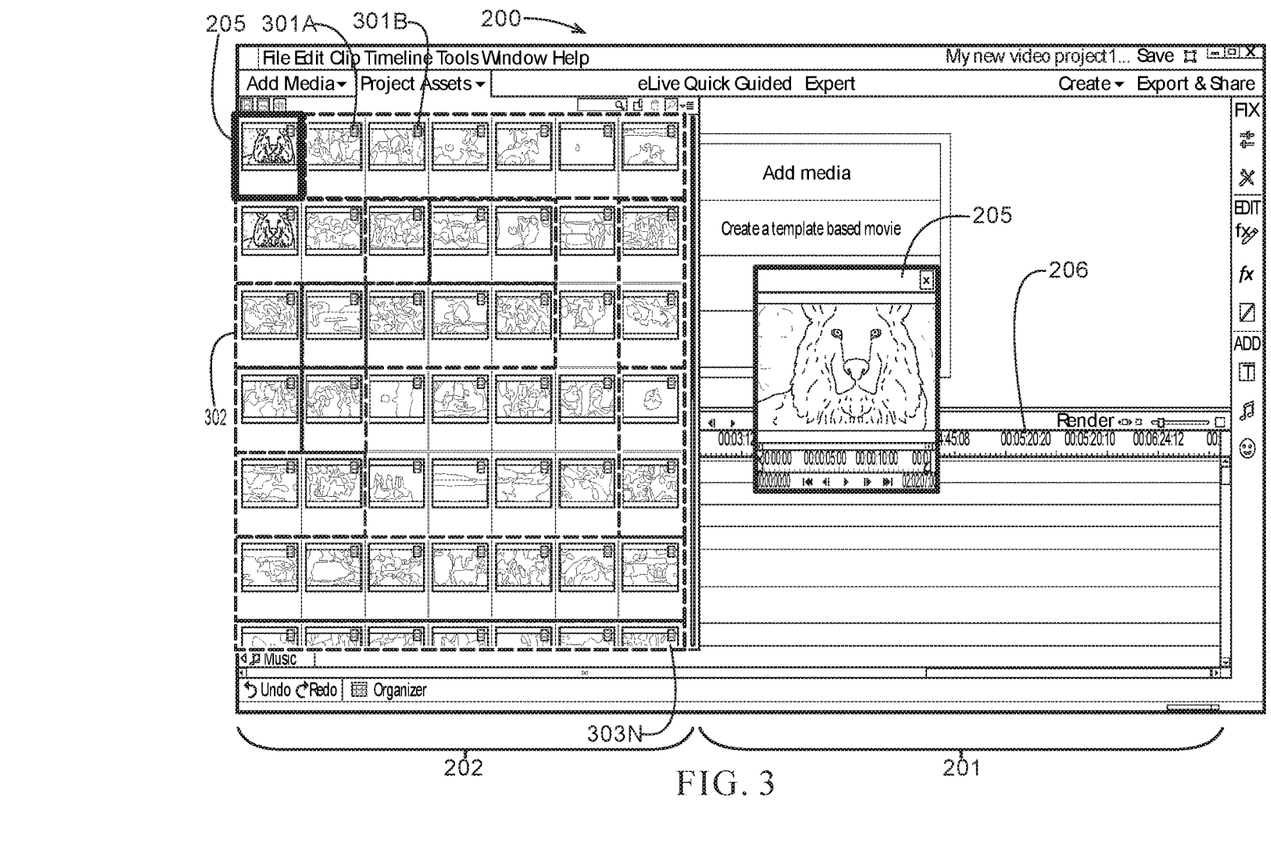
FIG. 3 is a block diagram illustrating the exemplary user interface of FIG. 2 with icons of videos of a video collection sorted based on the selection of the video for inclusion in the composition.

FIG. 3 is a block diagram illustrating the exemplary user interface 200 of FIG. 2 with icons 301A-N of videos of the video collection sorted based on the selection of the video for inclusion in the composition. In this example, the graphical indicator 302 identifies, for the user, videos that have been identified as similar to the selected video. In this example, some of the videos displayed in the media bin portion 202 after the sorting are randomly identified and thus are not necessarily similar to the currently selected videos. This randomness presents the user with a media bin that shows both similar videos and dissimilar videos for selection, which provides a variety of selection options to the user. A user currently adding a video of a lion may be more likely to select other videos of lions and wildlife than to select other types of content. The sorting based on similarity ensures that some (e.g., more than otherwise) of the first displayed options will be similar to the selected video. Similarly, the graphical indicator 302, surrounding the similar videos, distinguishes those similar videos from the other videos to the user. The randomness accounts for the chance that the user is interested in including other, less similar videos.

In this example, the selected video relates to wildlife. Based on determining that a "wildlife" tag has a high probability of accurately describing the first video, the user interface is sorted so that other videos are prioritized based on their also having high probabilities of being described accurately by the "wildlife" tag. The icons 301A-N of the videos are reordered and/or distinguished from those that are not determined to be as similar to the selected video.

As additional videos are selected for inclusion in the composition/timeline, the videos in the media bin 202 are resorted and re-displayed accordingly. After a first video is added that depicts a lion, the other videos are sorted based on similarity (e.g., to tags "lion," "wildlife," etc.) As a second video is added, the other videos are resorted and redisplayed based on the currently-selected video (i.e., the second video) and/or the other included videos (i.e., the first video). If the user includes an elephant video the videos in the media bin are resorted and re-displayed based on different tags (e.g., tags "wildlife", "Africa," and "elephant."). In this way, the user interface is continually adjusted as the user selects and/or adds and removes videos to a composition/timeline.

The subject matter of the user's currently-selected video can be given greater weight than the subject matter of previously-included videos. This helps ensure that the video sorting relates most to the user's current work topic, which is particularly useful in the context of creating longer compositions (e.g., having multiple chapters) that involve varying topics.

Figure 4:
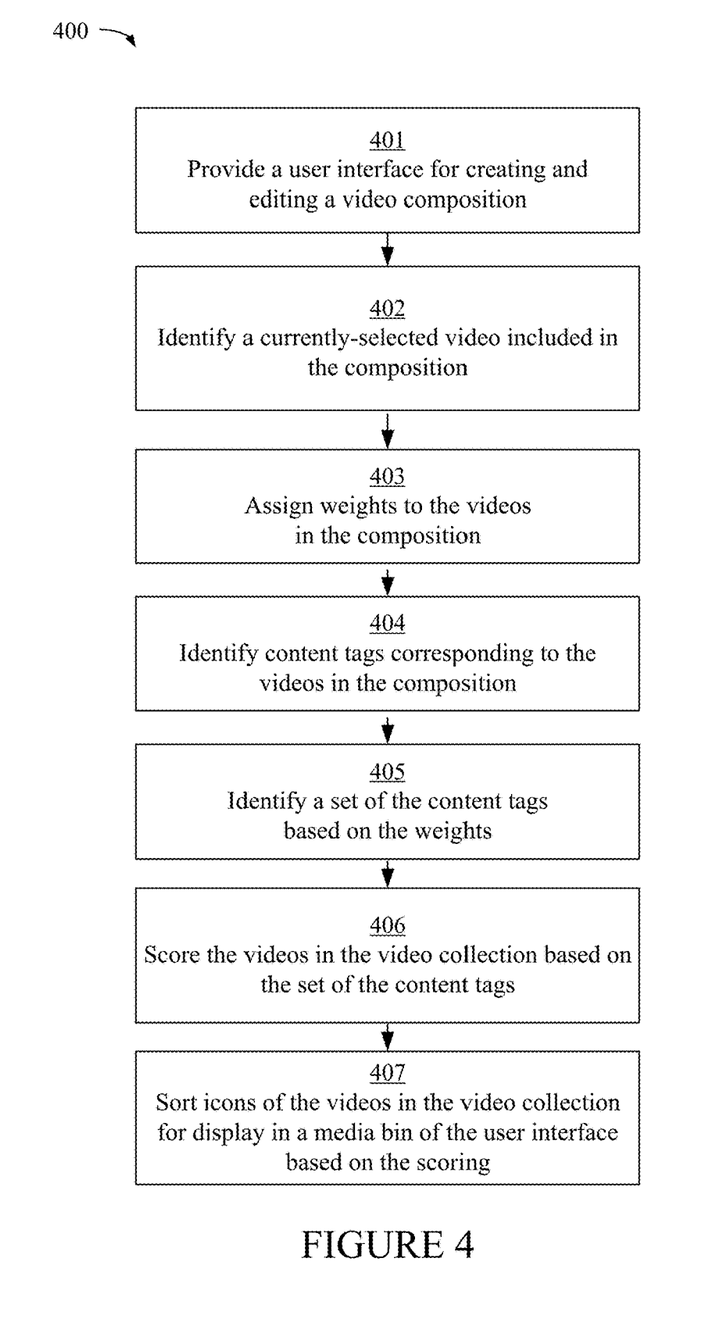
FIG. 4 is a flow chart illustrating an exemplary technique for automatic and intelligent video sorting in the context of video composition creation.

Exemplary Techniques for Video Sorting in the Context of Video Composition Creation FIG. 4 is a flow chart illustrating an exemplary technique for automatic and intelligent video sorting in the context of video composition creation. The exemplary technique 400 can be implemented by user device 102a and/or creative apparatus 108, although other devices and configurations can also be implemented. The exemplary technique 400 can be implemented by storing and executing instructions in a non-transitory computer-readable medium. Reference to the technique 400 being performed by a computing device includes the technique 400 being performed by one or more computing devices.

Technique 400 involves providing a user interface for creating and editing a video composition, as shown in block 401. In one embodiment of the invention, the user interface includes a media bin and a timeline, such as those depicted in FIGS. 2-3. The media bin displays and provides access (e.g., by scrolling etc.) to icons representing videos of a video collection that are available to be included in the composition that is being created. The timeline identifies videos that are included in the composition at respective times within the composition. For example, a first video may be included to be played from time 0 to time 1 minute, a second video may be included to be played from time 1 minute to time 3 minutes, a third video may be included to be played from time 3 minutes to time 3 minutes 30 seconds, etc. The videos included in the composition/timeline can be included on one or more tracks that, for example, are used to organize the videos to play in a particular order. The videos included in the composition can be considered to be near and far from one another based on time separation, track differences, and other such characteristics. In the example above the first video can be considered to be closer to the second video than to the third video based on such a determination.

Technique 400 further involves identifying a currently-selected video included in the composition, as shown in block 402. For example, the user interface can receive input and determined based on a command associated with the input whether the input is adding a video to be included in a video composition or otherwise selecting a video.

Technique 400 further involves assigning weights to the videos in the composition, as shown in block 403. In one embodiment of the invention, weights are assigned based on distances on the timeline of the videos in the composition to the currently-selected video. In another embodiment, the weights are assigned based on whether the videos in the video composition are categorized as near or far from the currently-selected video in the timeline. In one example, a time threshold (e.g., 30 seconds, 1 minute, 2 minutes, 5 minutes, etc.) is used to categorize videos in the video composition as near or far from the currently-selected video in the timeline. For example, if the threshold is 2 minutes, then videos that are positioned on the timeline within 2 minutes before or after the currently-selected video are categorized as near and videos that are positioned on the timeline outside of 2 minutes before or after the currently-selected video are categorized as far. Weights for the near category videos can differ from the weights for the far category video to reflect the likely greater significance/relevance of those videos to what the user is currently working on. For example, if a user creates a 1 hour video composition of a safari with multiple chapters for different geographic regions that were explored during the safari, videos that are near the currently-selected video on the timeline can be weighted differently than videos that are far. The videos that are near are more likely to relate to the subject matter of the chapter the user is currently working on and are thus given relatively greater weight. The videos that are far are less likely to relate to the subject matter of the chapter and thus are given relatively smaller weight. In other examples, multiple categories are used. For example, the following four categories could be used: (a) within 1 minute of the currently selected video; (b) within 5 minutes of the currently selected video; (c) within 10 minutes of the currently-selected video; and (d) outside of 10 minutes of the currently-selected video. The weights assigned to the videos in each of these categories can vary depending on the category. In one example, greater weights are given to videos in categories that include videos closer in time to the currently-selected video to reflect the likely greater significance of videos that are closer in time on the timeline to what the user is currently working.

In another embodiment of the invention, weights are assigned based on how far tracks of the videos in the video composition are to a track having the currently-selected video. In another embodiment of the invention, weights are assigned based on amounts of time (i.e., that the user spends during the creation of the composition) between inclusion of the videos in the composition and inclusion of the currently-selected video in the composition. In another embodiment of the invention, assigning the weights to the videos in the composition is based on similarity of file creation date, video location information, and/or video camera information of the videos in the composition to the currently-selected video. In other embodiments of the invention weights are assigned based on various combinations of the above-noted features.

Technique 400 further involves identifying content tags corresponding to the videos in the composition, as shown in block 404. In one embodiment, tags are already associated with the videos, for example as metadata, and the tags are simply retrieved for the videos. In another example, tags are generated for one or more of the videos on the fly, for example, using one or more of the video tagging techniques disclosed herein or another appropriate video tagging technique.

After identifying the content tags, the technique 400 identifies a set of the content tags based on the weights, as shown in block 405. In certain embodiments of the invention, the set of content tags is determined by using the weights to score the content tags of the videos. For example, this can involve determining probabilities of content tags (e.g., automatically generated tags) accurately identifying content of the videos of the composition. Such probability information may be provided by a content tagging engine that generates the tags based on one or more frames of the videos. These probabilities are used with the weights assigned to the videos to determine scores of each of the content tags. These scores are combined into combined scores for the each of the content tags. Thus, if two videos in the composition both have scores for the content tag "wildlife," those scores are combined to create a combined score for the "wildlife" content tag. The combined scores are then used to identify the set of content tags that will be used in the video sorting. For example, the technique can select five (or another predetermined number of content tags) to use. As another example, the technique can select all of the content tags having a combined score that exceeds a predetermined threshold.

The technique 400 next scores the videos in the video collection based on the set of content tags, as shown in block 406, and sorts the icons of the videos in the video collection for display in a media bin of the user interface based on the scoring, as shown in block 407.

The following algorithm provides a specific example of the technique 400 of FIG. 4. In this exemplary algorithm, let 'n' be the number of videos added to the composition/timeline. Initially n=0. When a new video V is selected, for example from the media bin and added to the composition/timeline, the exemplary algorithm (a) determines the track on which the video was dropped and (b) categorize all videos on timeline as—nearby and far from the video V. The nearby videos are those that are adjacent to V while others are categorized as far away videos.

The algorithm next assigns a weight to each video ($V_i$) other than V present on the timeline. This weight is a composite of multiple weights which are defined based on one or more of the following parameters. The first parameter, $W_1$, is based on distance of the track of $V_i$, from the track of V. $W_1$ will have highest value if the track is same and will have minimum value if the tracks are farthest from one another. The second parameter, $W_2$, is based on whether $V_i$, is in the nearby category or the far away category. The nearby category will have more weight, while the far away category will have lower weight. The third parameter, $W_3$, is based on how much time before V, $V_i$, was dropped on the timeline. The less time, the more the weight. The fourth parameter, $W_4$, is based on other factors, such as similarity between file creation dates, GPS locations, camera make etc. of V to $V_i$. Let W be cumulative weight of all these above mentioned weights (W1, W2, W3, etc.).

Content tags and scores are identified for each video included in the composition, for example, using the techniques and algorithms described herein and/or any other appropriate techniques. The score of a content tag j on a video $V_i$, is referred to herein as $S_{ij}$ and it is calculated using the $P_{ij}$ (probability of a content tag generated automatically providing an accurate description) and W (cumulative weight of the video), as shown below:

$$S_{ij} \text{ for a content tag } j \text{ on video } V_i = (W * P_{ij})$$

When a content tag is generated for a video, the content tag generation process can provide a probability associated with the tag for the video. For example, there may be a 90% probability that a video will contain the lion, yielding a 0.9 probability score for the tag "lion." Based on that probability score and the weights that were identified for that video, a score, $S_{ij}$, is determined. For example, if "lion" and "wildlife" tags are identified with respective probability scores (0.9 and 0.7) for a video that has a weight 0.5, then those values can be used to determine $S_{ij}$ for each tag for the video, i.e., for "lion" 0.45 (0.9*0.5) and for "wildlife" 0.35 (0.7*0.5).

The total score for a content tag 'j' is $S_j$=sum of all $S_{ij}$ for all videos $V_i$. For example, if one video has a $S_{ij}$ of 0.45 for the "lion" and a second included video has a $S_{ij}$ of 0.55 for the "lion" tag, the combined score $S_j$ for the lion tag is 1.0. Of all content tags on videos $V_i$, the algorithm selects the top 'm' tags (e.g., the top 5 tags) which have highest scores $S_j$. In some embodiments, m is specified based on user preferences and/or determined based on machine learning.

The algorithm uses the top 'm' tags to sort the videos of the video collection in the media bin. For example, the algorithm can select the videos in the media bin having the highest matching score with these 'm' tags. In one example, each tag that is generated has its name and associated probability score and the matching can be performed by matching the tag names and probability scores. The algorithm sorts the media bin so that better matching videos have a greater likelihood of appearing at the top of the media bin where they will be seen more quickly by the user and those with lower scores will be more likely to appear down the media bin. The algorithm enables the automatic presentation of more relevant videos in the user's media bin based on his/her usage of videos in the composition/timeline. This makes creation very fast and easy and saves a lot of time that the user could otherwise spends searching for relevant videos.

The exemplary algorithm also weights the scores that are assigned to tags using one or more criteria that prioritize the currently-selected video over previously selected videos. In many video composition projects, especially those that are complex and lengthy, there are multiple different topics and contexts in which the user will be working. The videos that are included in the first 5 minutes of a video composition may have a significantly different context than those that are included 45 minutes later at the end of the composition, for example. Prioritizing the currently-selected video and other videos based on the currently selected video using weights helps ensure that the video sorting accounts for these changes in context to sort videos using subject matter that is most likely to be relevant to what the user is currently working on.

Figure 5:
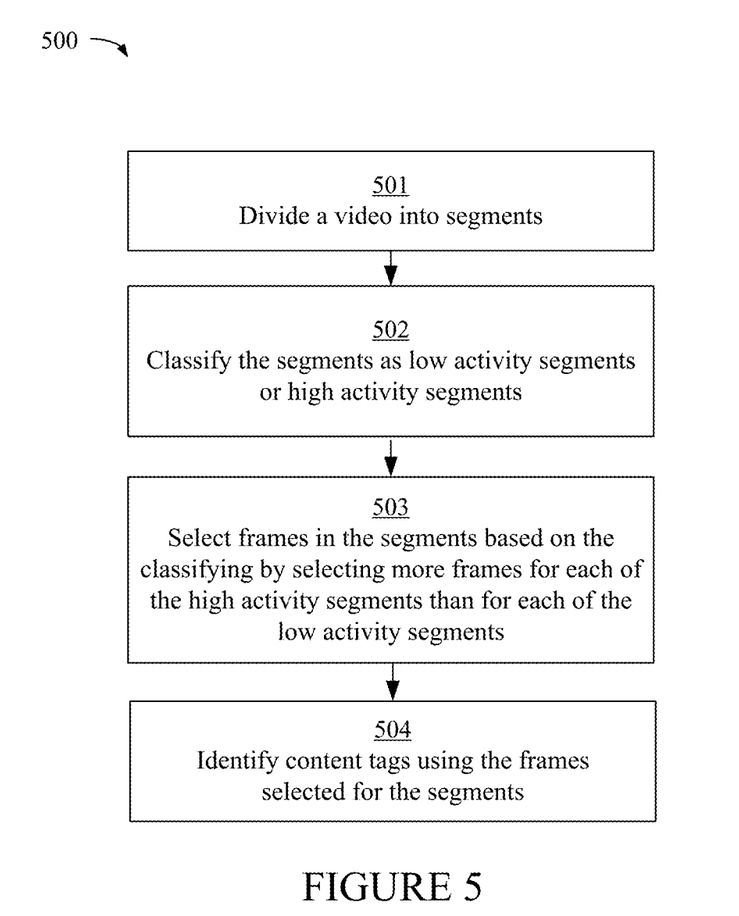
FIG. 5 is a flow chart illustrating an exemplary technique for automatically and intelligently identifying content tags for a video.

FIG. 5 is a flow chart illustrating an exemplary technique for automatically and intelligently identifying content tags for a video. The exemplary technique 500 can be implemented by user device 102a and/or creative apparatus 108, although other devices and configurations can also be implemented. The exemplary technique 500 can be implemented by storing and executing instructions in a non-transitory computer-readable medium. Reference to the technique 500 being performed by a computing device includes the technique 500 being performed by one or more computing devices.

The technique 500 involves dividing a video into segments, as shown in block 501. The video can be divided into segments randomly or based on analysis of the content of the video. For example, the video can be divided into segments based on scene change detection, motion change detection, face detection, object detection, or some combination of these and other techniques that analyze and compare frames of the video at different times during the video.

The technique 500 further involves classifying the segments as low activity segments or high activity segments, as shown in block 502. This classification is based on detecting an amount of change between two or more frames of each segment in one embodiment of the invention. The amount of change can be based on feature point changes. For example, the positions of faces, people, and other objects can be detected and compared in two or more frames of each segment to assess and quantify an amount of activity. Segments having less than a threshold amount of activity are classified as low activity and segments having more than the threshold amount of activity are classified as high activity in one embodiment of the invention.

The technique 500 next involves selecting frames in the segments based on the classifying by selecting more frames for each of the high activity segments than for each of the low activity segments, as shown in block 503. For example, a single frame may be selected for each low activity segment and three frames may be selected for each high activity segment.

The technique 500 next involves identifying content tags using the frames selected for the segments, as shown in block 504. In one embodiment, the selected frames are used as input to an image tagging engine that generates tags for images based on machine learning, e.g., based on having been trained to do so using ground truth images with known tags.

Figure 6:
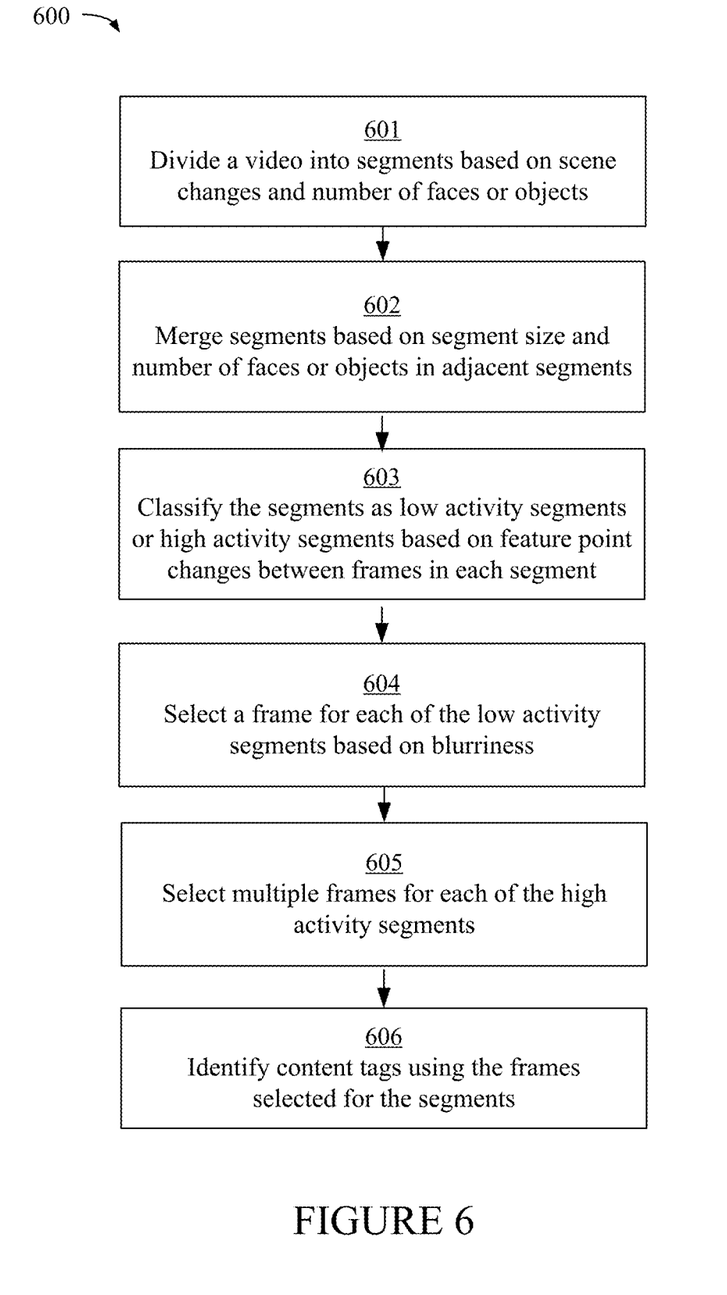
FIG. 6 is a flow chart illustrating another exemplary technique for automatically and intelligently identifying content tags for a video.

FIG. 6 is a flow chart illustrating another exemplary technique 600 for automatically and intelligently identifying content tags for a video. The exemplary technique 600 can be implemented by user device 102a and/or creative apparatus 108, although other devices and configurations can also be implemented. The exemplary technique 600 can be implemented by storing and executing instructions in a non-transitory computer-readable medium. Reference to the technique 600 being performed by a computing device includes the technique 600 being performed by one or more computing devices.

The technique 600 involves dividing a video into segments based on scene changes and the number of faces or objects, as shown in block 601. Scene changes can be detected, for example, based on detecting an amount of similarity (e.g., feature points, faces, people, objects, backgrounds, overall pixel similarity, etc.) from one frame to the next in the video. Any known or to be developed scene change detection technique can be used. Similarly, the number of faces or the number of objects in the image can be detected based on any known or to be developed detection technique.

The technique 600 next involves merging segments based on segment size and the number of faces or objects in adjacent segments, as shown in block 601. For example, segments of less than a threshold number of frames (e.g., 3, 4, 5, 10, 20, etc.) can be considered for merger with adjacent segments. Similarly, in another example, segments having the same or similar number of faces and/or objects as adjacent segments can be considered for merger with those adjacent segments.

The technique 600 next classifies the segments as low activity segments or high activity segments based on feature point changes between frames in each segment. The technique 600 selects a single frame for each of the low activity segments based on blurriness, as shown in block 604. For example, the amount of blurriness in each frame can be measured using an algorithm that detects blurriness based on the relationships of pixels in the frames, edges within the frames, and/or other indicia of blurriness within the frames. The technique 600 also selects multiple frames for each of the high activity segments. The number of frames selected can be based on the amount of activity, with higher activity segments having a greater number of frames selected. The frames that are selected can be selected based on the length of the segment, the blurriness of the frames, the portion of the segment (beginning, middle, end, first ⅕, second ⅕, etc.) in which the segment appears, or a combination of these and other factors.

The technique 600 then identifies content tags using the frames selected for the segments, as shown in block 606. In one embodiment of the invention, this involves providing each selected frame to an image tagging engine and combining the tags that are returned for segments that have multiple selected tags.

The following algorithm provides a specific example of the technique 600 of FIG. 6. This exemplary algorithm identifies scene changes in a video and divides the video into segments, referred to herein as S1, S2, S3, etc. Based on face detection, the algorithm additionally or alternatively divides the video into a number of segments such that each segment contains same number of faces. Such segments are referred to herein as F1, F2, F3, etc.

The algorithm next identifies segments from F1, F2, F3, etc. which satisfy one or more criteria for merging. In one embodiment of the invention, the algorithm merges segments based on the number of faces. In one example, this involves identifying segments from F1, F2, F3, etc. which are very small segments (duration wise), for example, only having a few frames or only 1-2 seconds in length. Such segment are referred to herein as $F_i$. In this example, the algorithm checks if the number of faces in each previous segment $F_{i-1}$ is same as number of faces in the next segment $F_{i+1}$. In this example, the algorithm also checks whether the relative position of faces on the last frame of $F_{i-1}$ and position of faces on first frame of $F_{i+1}$ are almost same. After identifying segments meeting such criteria, the algorithm merges all such segments $F_i$ meeting the criteria with $F_{i-1}$ and $F_{i+1}$. Such merging of segments is based on the expectation that meeting such criteria is indicative of a false segment boundary. A false segment boundary can be originally identified, for example, in a circumstance in which one or more faces are going out or coming into a sequence of frames momentarily due to camera shake, boundary cropping, and/or a person's face going out or coming into the sequence of frames for a very few frames due to movement of the person.

In addition, or the alternative, to merging segments based on the number of faces, the algorithm merges segments (e.g., segments O1, O2, O3, etc.) based on the number of objects. The technique can be the same as the one used to merge segments based on faces with the difference that objects are detected and compared rather than faces.

In sum, the exemplary algorithm merges segments based on scene, faces, and/or object detection and comparison to create merged segments referred to herein as M1, M2, M3, etc. Each of these merged segments is expected to have a different type of content based on the segmentation and merging processing.

Next, the algorithm identifies frames for each of the segments. In this example, the algorithm uses an activity-based technique. For each merged segment M1, M2, M3, etc, the algorithm finds and tracks feature points. Let $P1_i$, $P2_i$, $P3_i$, etc. be feature points in frame number fi. Let $P1_{i+1}$, $P2_{i+1}$, $P3_{i+1}$, etc. be feature points in frame number $f_{i+1}$ and so on. For frame $f_{i+1}$, the algorithm calculates deltaP1=distance between point $P1_i$ and $P1_{i+1}$, and similarly calculates deltaP2, deltaP3, and so on. The algorithm next determines the net delta for frame $f_{i+1}$=$Df_{i+1}$=avg(deltaP1, deltaP2,deltaP3, etc.) and similarly calculates the net delta for all frames. The algorithm then classifies each segment Mi as a low activity segment or a high activity segment. Low activity segments ($LA_1$, $LA_2$, $LA_3$, etc.) includes the segments in which all the frames have Df less than a threshold value 't'. This threshold value can be selected based on experimentation and/or improved using machine learning and/or user input. High activity segments ($HA_1$, $HA_2$, $HA_3$, etc) include the segments in which all of the frames have Df greater than the threshold value 't'.

The algorithm next selects representative frames for the segments based on the classification of the segments. For each low activity segment, the algorithm picks one representative frame with the highest representative score compared to the other frames in the segment. The representative score ($RS_i$) for each frame $f_i$, in this LA segment is calculated on basis of various criteria. In one example, the criteria includes a bluriness factor (B) in which the higher the blur, the higher the value of B, e.g., 0 (no blur)<=B<=1 (max blur). In another example, the delta for the frames Dfi are additionally or alternatively used to identify the representative score $RS_i$. In one embodiment: RSi=w1*(1−B)+w2*(1−Dfi), where w1 and w2 are weights. In one embodiment, w1 and w2 are 0.5, however, these values can be selected based on the circumstances of the implementation or based on user input to favor certain qualities of the frames chosen as representative frames. The selected representative frames are referred to herein as FLA1, FLA2, FLA3, etc. Each of these representative frames is sent to an image tagging engine to identify tags for each frame. The algorithm then attaches the tags returned for each frame to their parent segments LA1, LA2, LA3, etc.

The algorithm also selects frames for the high activity segments. For each high activity segment, e.g., HA1 the algorithm selects multiple frames. In one example, the algorithm selects three frames. In this example, one frame is selected from the beginning of the high activity segment (FHA11), one frame is selected from somewhere in the middle of the high activity segment (FHA12), and one frame is selected from the end of the high activity segment (FHA13). One or more of the selected frames, can additionally be selected based on representative score. In one example, the frame selected for the middle is selected by identifying the frame in the middle having the highest representative score (which is described above). The representative frames that are selected for the high activity segment are sent to the image tagging engine and the output tags are used to tag the segments. Since the segments involve high activity, apart from nouns the algorithm is also able to get verbs identified by these multiple frames via an image tagging engine such as the image tagging engine provided in Adobe Elements® offered by Adobe Systems, Inc. of San Jose, Calif. Such verbs can be used to identify the types of activity that are occurring in these high activity segments. Also since this segments involve high activity, chances may be very high that the frames would not have clear content. To address blur and lack of clarity, the returned tags for the three representative frames are averaged to generate tags on the parent high activity segment, HA1, HA2, HA3, etc. This can involve matching tag names and then averaging the associated probabilities.

The techniques described above are generally able to segregate a video into unique differential segments and each of such segments is tagged for content automatically. Since the techniques run image tagging using only on few representative frames, instead of running on all frames of the video, the techniques are relatively very fast (e.g., faster than real time ~0.3× on CPU for HD video). Instead of 6× time or more that a normal image tagging engine would take (for a 30 fps video), the technique can use only ~0.3× time (including the video analysis part—which includes scene, face, activity detection etc.)

The techniques disclosed herein generally provide numerous advantages over prior video compilation creation techniques. The techniques provide and enable the dynamic sorting of videos that is particularly useful to video professionals and curators dealing with large volumes of video content. New automatic video tagging techniques are also disclosed for use in video compilation creation and editing, as well as in other contexts. Unlike manual video which is tedious, time consuming, subjective, and subject to error and inconsistency, the automatic video tagging techniques presented herein provide automatic, efficient, fast, and objective tagging for videos. Some of those video tagging techniques are particularly well suited for tagging videos according to amount of activity and, consequently, are able to more accurately identify actions (e.g., verb tags) for videos. The technology presented herein is useful in other contexts beyond video compilation creation and video tagging. For example, the techniques can be applied in the context of a stock database to enable searching for and sorting of content related to user's initial stock selections.

Exemplary Computing Device

Figure 7:
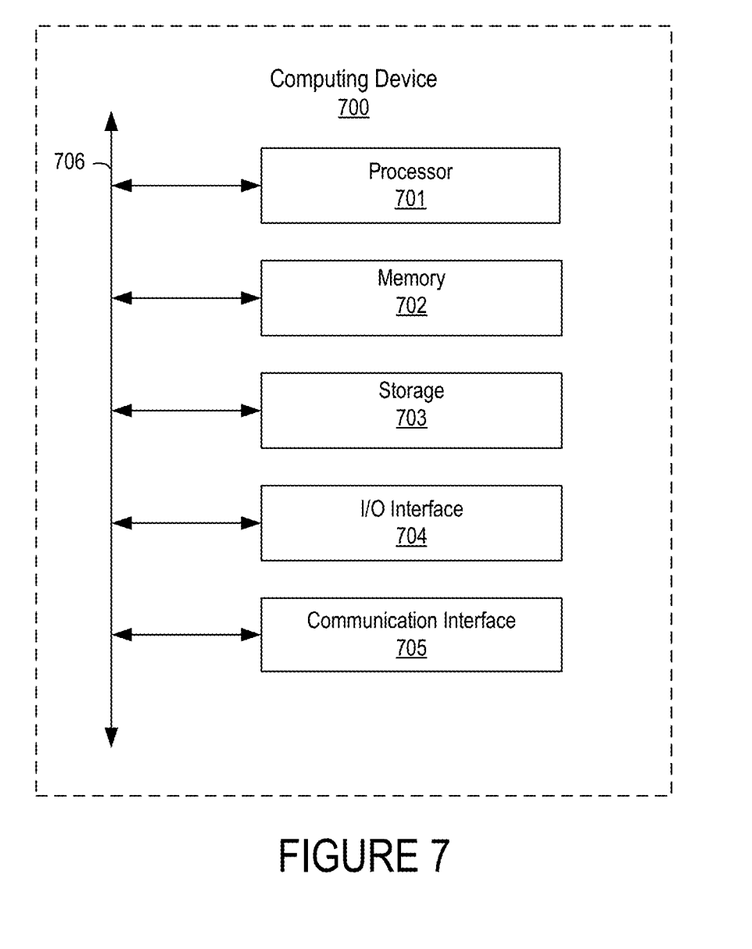
FIG. 7 is a block diagram depicting an example hardware implementation.

Any suitable computing system or group of computing systems can be used to implement the techniques and methods disclosed herein. For example, FIG. 7 is a block diagram depicting examples of implementations of such components. The computing device 70 can include a processor 71 that is communicatively coupled to a memory 72 and that executes computer-executable program code and/or accesses information stored in memory 72 or storage 73. The processor 71 may comprise a microprocessor, an application-specific integrated circuit ("ASIC"), a state machine, or other processing device. The processor 71 can include one processing device or more than one processing device. Such a processor can include or may be in communication with a computer-readable medium storing instructions that, when executed by the processor 71, cause the processor to perform the operations described herein.

The memory 72 and storage 73 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 70 may also comprise a number of external or internal devices such as input or output devices. For example, the computing device is shown with an input/output ("I/O") interface 74 that can receive input from input devices or provide output to output devices. A communication interface 75 may also be included in the computing device 70 and can include any device or group of devices suitable for establishing a wired or wireless data connection to one or more data networks. Non-limiting examples of the communication interface 75 include an Ethernet network adapter, a modem, and/or the like. The computing device 70 can transmit messages as electronic or optical signals via the communication interface 75. A bus 76 can also be included to communicatively couple one or more components of the computing device 70.

The computing device 70 can execute program code that configures the processor 71 to perform one or more of the operations described above. The program code can include one or more modules. The program code may be resident in the memory 72, storage 73, or any suitable computer-readable medium and may be executed by the processor 71 or any other suitable processor. In some embodiments, modules can be resident in the memory 72. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, performed by a computing device, for sorting videos of a video collection for selection to be included in a composition, the method comprising:

providing, for display, a user interface comprising a media bin and a timeline, the media bin comprising icons representing videos of the video collection that are available to be included in the composition and the timeline identifying videos included in the composition at respective times within the composition, the icons being displayed in a first order;

identifying a currently-selected video included in the composition;

assigning weights to the videos in the composition based on distances on the timeline of the videos in the composition to the currently-selected video;

identifying content tags corresponding to the videos in the composition;

identifying a set of the content tags based on the weights assigned to the videos in the composition;

scoring the videos in the video collection based on the set of the content tags;

sorting the icons of the videos in the video collection based on the scoring of the videos in the video collection; and displaying the icons in the media bin in a second order, based on the sorting.

2. The method of claim 1, wherein assigning the weights to the videos in the composition comprises assigning the weights based on how far tracks of the videos in the video composition are to a track having the currently-selected video.

3. The method of claim 1, wherein assigning the weights to the videos in the composition is based on whether the videos in the video composition are categorized as near or far from the currently-selected video in the timeline.

4. The method of claim 1, wherein assigning the weights to the videos in the composition is based on amounts of time between inclusion of the videos in the composition and inclusion of the currently-selected video in the composition.

5. The method of claim 1, wherein assigning the weights to the videos in the composition is based on similarity of file creation date, video location information, or video camera information of the videos in the composition to the currently-selected video.

6. The method of claim 1, wherein identifying content tags corresponding to the videos in the composition comprises, for a video:

dividing the video into segments based on scene changes and number of faces or objects;

merging segments based on segment size and number of faces or objects in adjacent segments;

classifying the segments as low activity segments or high activity segments based on feature point changes between frames in the segments;

selecting one or more frames in the segments based on the classifying of the segments, wherein more frames are selected for the high activity segments than the low activity segments; and identifying content tags using the one or more frames selected for the segments as input to an image tagging engine.

7. The method of claim 6, wherein selecting the one or more frames in the segments comprises, for the low activity segments, selecting a representative frame having a highest representative score, wherein the representative score is based on a blurriness factor.

8. The method of claim 6, wherein selecting the one or more frames in the segments comprises, selecting three frames for each of the high activity segments, the three frames comprising a first frame from a beginning portion of the respective segment, a second frame having a highest representative score, and a third frame from an ending portion of the respective segment.

9. The method of claim 1, wherein identifying the set of the content tags comprises:

determining probabilities of automatically-generated content tags accurately identifying content of the videos of the composition;

determining scores of the content tags based on the probabilities and the weights assigned to the videos in the composition;

determining combined scores for the content tags by combining the scores of each content tag for the videos in the composition; and identifying the set of content tags based on the combined scores for the content tags.

10. The method of claim 8, wherein identifying the set of content tags further comprises identifying a predetermined number of the content tags based on the combined scores for the content tags.

11. A system for sorting videos of a video collection for selection to be included in a composition, the system comprising:

at least one processor; and at least one memory configured to store instructions executable by the at least one processor, the instructions, when executed, being configured to:

provide a user interface for display, the user interface comprising a media bin and a timeline, the media bin comprising icons displayed in a first order and representing videos of the video collection that are available to be included in the composition, and the timeline identifying videos included in the composition at respective times within the composition;

identify a set of content tags for the videos included in the composition based on a currently-selected video;

score, based on the set of content tags, a relative likelihood of selection of each of the videos of the video collection for inclusion in the composition;

sort the icons of the videos in the video collection for display in the media bin based on the scoring the videos in the video collection; and display the icons in a second order, based on the sorting.

12. The system of claim 11, wherein the means for identifying a set of content tags for the videos included the composition based on a currently-selected video comprises a computing device performing operations comprising:

identifying a currently-selected video included in the composition;

assigning weights to the videos in the composition based on distances on the timeline of the videos in the composition to the currently-selected video;

identifying content tags corresponding to the videos in the composition; and identifying the set of the content tags based on the weights assigned to the videos in the composition.

13. The system of claim 12, wherein assigning the weights to the videos in the composition comprises assigning the weights based on how far tracks of the videos in the video composition are to a track having the currently-selected video.

14. The system of claim 12, wherein assigning the weights to the videos in the composition is based on whether the videos in the video composition are categorized as near or far from the currently-selected video in the timeline.

15. The system of claim 12, wherein assigning the weights to the videos in the composition is based on:

amounts of time between inclusion of the videos in the composition and inclusion of the currently-selected video in the composition; or similarity of file creation date, video location information, or video camera information of the videos in the composition to the currently-selected video.

16. The system of claim 12, wherein identifying the content tags corresponding to the videos in the composition comprises, for a video, dividing the video into segments based on scene changes and number of faces or objects;

merging segments based on segment size and number of faces or objects in adjacent segments;

classifying the segments as low activity segments or high activity segments based on feature point changes between frames in the segments;

selecting one or more frames in the segments based on the classifying of the segments, wherein more frames are selected for the high activity segments than the low activity segments; and identifying content tags using the one or more frames selected for the segments as input to an image tagging engine.

17. The system of claim 16, wherein selecting the one or more frames in the segments comprises:

for the low activity segments, selecting a representative frame having a highest representative score, wherein the representative score is based on a blurriness factor; and selecting three frames for each of the high activity segments, the three frames comprising a first frame from a beginning portion of the respective segment, a second frame having a highest representative score, and a third frame from an ending portion of the respective segment.

18. A non-transitory computer-readable medium storing instructions, the instructions comprising instructions for:

providing a user interface for display, the user interface comprising a media bin and a timeline, the media bin comprising icons displayed in a first order and representing videos of the video collection that are available to be included in the composition, and the timeline identifying videos included in the composition at respective times within the composition;

identifying a set of content tags for the videos included in the composition;

scoring the videos in the video collection based on the set of the content tags;

sorting the icons of the videos in the video collection based on the scoring of the videos in the video collection; and displaying the icons in the media bin in a second order, based on the sorting.

19. The non-transitory computer-readable medium of claim 18, wherein identifying the set of content tags for the videos included in the composition comprises:

identifying a currently-selected video included in the composition;

assigning weights to the videos in the composition based on distances on the timeline of the videos in the composition to the currently-selected video;

identifying content tags corresponding to the videos in the composition; and identifying the set of the content tags based on the weights assigned to the videos in the composition.

20. The non-transitory computer-readable medium of claim 18, wherein identifying the set of content tags for the videos included in the composition comprises, for a video:

dividing the video into segments based on scene changes and number of faces or objects;

merging segments based on segment size and number of faces or objects in adjacent segments;

classifying the segments as low activity segments or high activity segments based on feature point changes between frames in the segments;

selecting one or more frames in the segments based on the classifying of the segments, wherein more frames are selected for the high activity segments than the low activity segments; and identifying content tags using the one or more frames selected for the segments as input to an image tagging engine.

* * * * *